Figure 1:
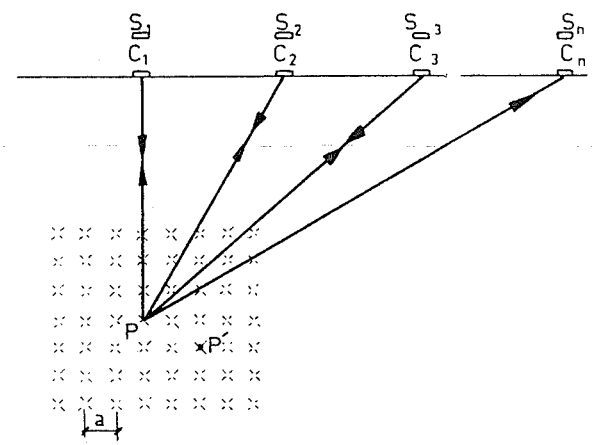

United States Patent [19]
Grau et al.

[11] 3,764,967
[45] Oct. 9, 1973

[54] NEW METHOD FOR THE COMPOSITION OF RECORDINGS AND DEVICE FOR CARRYING OUT THE SAME

[75] Inventors: Gerard Grau, Paris; Andre Fontanel, Asnieres, both of France

[73] Assignee: Institut Francais du Petrole des Carburants et Lubrifiants, Rueil Malmaison, France

[22] Filed: May 19, 1970

[21] Appl. No.: 38,798

[30] Foreign Application Priority Data
May 19, 1969 France .............................. 6916504

[52] U.S. Cl. 340/15.5 SS, 340/15.5 MC, 340/15.5 DS
[51] Int. Cl............................................. G01v 1/28
[58] Field of Search............... 340/15.5 SS, 15.5 DS, 340/15.5 MC, 15.5 CP

[56] References Cited
UNITED STATES PATENTS
3,698,009  10/1970  Barbier .............................. 346/33 C
3,638,176  1/1970   White ........................ 340/15.5 MC
3,353,151  11/1967  Rockwell ..................... 340/15.5 CP Primary Examiner—Benjamin A. Borchelt
Assistant Examiner—H. A. Birmiel
Attorney—Craig, Antonelli, Stewart and Hill

[57] ABSTRACT

Method for the composition of seismic recordings whereby images of transmission and/or reception points with respect to sub-surface mirrors and diffracting points can be restored at their actual location in sub-surface formations, comprising transmitting waves from said transmission points through the surveyed zone, recording them after diffraction or reflection at said reception points, forming a restoration network of arbitrarily selected points of said surveyed zone and determining the travel time from a transmission point to a reception point via one of said points of the network, selecting from each record trace a sample corresponding to said travel time, combining said samples in a unitary value which is assigned to the corresponding point of the network, and identifying the position of the image points and diffracting points at the locations of the points of the network to which have been assigned the highest values.

24 Claims, 15 Drawing Figures

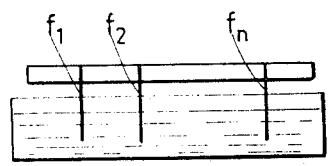
FIG.14
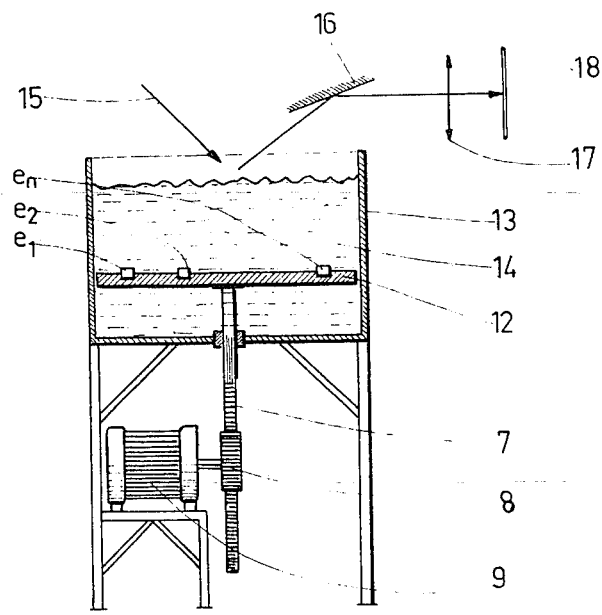
FIG.12
FIG.15
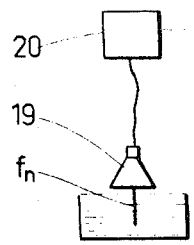
FIG.13
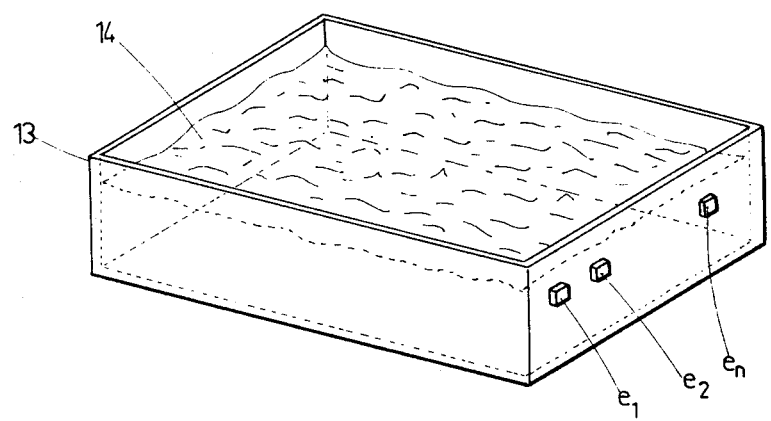

NEW METHOD FOR THE COMPOSITION OF RECORDINGS AND DEVICE FOR CARRYING OUT THE SAME

This invention relates to a new method for the composition of recordings of waves the magnitudes of which during time, corresponding to transmission and/or reception points distributed in space, so as to restore at their actual location in space, either the reflecting or diffracting bodies.

A very interesting application of this method is that of seismic prospecting.

According to the usually utilized methods in seismic prospecting waves are transmitted through the ground and, after reflection or diffraction, are recorded during time by means of pick-ups.

The reflections and diffractions are identified on the records by pulses of high amplitude corresponding to high energy levels at very precise times. Each time of arrival corresponds to the travel time of the waves from the energy source to the reflecting or diffracting point and from there to the pick-up. In the case of conventional presentation of records, the existence of reflection points corresponding to a sub-surface mirror, if any, is detected by setting in phase these various pulses of high amplitude, the individual records or traces being laid adjacent to one another in the same order as the corresponding pick-ups.

In order to improve the signal-to-noise ratio, it is well known to sum up the records corresponding to different travels of the waves reflected from the same point of a mirror, whereby is carried out the method known as "multiple coverage method" (described for example in US Pat. No. 2,732,906). However this requires the adequate positioning of transmission sources and pick-ups. Moreover, in the case the reception points are different from the transmission points, it is necessary to subject each recorded trace to the so-called "dynamic corrections" which compensate for the obliqueness of the travels of the waves before summation. The mirror has then to be restored to its actual position in the space.

When the mirror is horizontal and the transmission and reception points coincide, each restored point of the mirror is located at the vertical of the transmission-reception point.

When the mirror has an inclination, each point of the mirror, as restored in space, is no longer at the vertical of the corresponding transmission-reception point and it is then necessary to proceed to a relatively complicated operation, called "migration" in order to determine the actual position of each point of the mirror.

For effecting the dynamic corrections and the migration, it is necessary to know the waves law of velocity, i.e the distribution of the propagation velocities of waves through the surveyed medium.

The method of the invention for composition of recordings, make use of recordings of the usual type.

In the case the method is used in seismic prospecting such recordings are those of waves generated by the firing of explosives, timely effected.

The method according to this invention provides for an operation equivalent to the "multiple coverage" but without imposing the position of the transmission and reception points.

Moreover, according to this method, it is no longer necessary to proceed to a "migration" operation in order to determine the actual position of the different points of a mirror. This actual position is obtained directly by the present method, without intermediary steps, once known the law of propagation velocities of waves through the surveyed medium.

This method is characterized in that waves are transmitted from at least one transmission point ($S_1, S_2 \ldots S_n$) through the surveyed zone; the waves reflected and/or diffracted at various points of said zone are received by pick ups and recorded, at least at one reception point ($C_1, C_2 \ldots C_n$) during time on different traces corresponding each to a pick up ; there is formed a restoration network composed of point P' of the surveyed zone; the distance of each point P' from the different transmission points ($P'S_1, P'S_2, \ldots, P'S_n$) and/or from the different reception points ($P'C_1, P'C_2, \ldots, PCn$) being chosen, the travel time ($t'_1, t'_2 \ldots, t'_n$) of the waves on the way from a transmission point ($S_1$), through a point P', to each of the corresponding reception points ($C_1$), is determined by the relationship : $t'_1 = (S_1 P' C_1)/Vm$ wherein $V_m$ is the average propagation velocity of the waves through the surveyed zone; there are selected, from each recording trace, samples corresponding respectively to travel times $t'_1, t'_2 \ldots t'_n$; said samples are combined in a composed value which is assigned to point P'; the same operation is performed for each point P' of the restoration network and the position of diffracting points P or the points S', C', images of transmission sources or reception points with respect to a mirror, are identified at the locations of the points P' whose assigned values are the highest.

The invention further comprises a device for practising the method. This device consists of a model essentially comprising an element (2, 14) sensitive to ultrasonic waves, associated to transmitters ($e_1, e_2 \ldots e_n$) of ultrasonic waves connected through coupling elements to the receivers ($C_1, C_2 \ldots C_n$) of the waves transmitted through the surveyed zone and diffracted and reflected in said zone, the sensitive element (2, 14) having all of its dimensions in the same ratio of proportionality ($\alpha$) with the surveyed zone, the spacing between the transmitters ($e_1, e_2 \ldots e_n$) thus being in the same ratio ($\alpha$) with the corresponding spacings between the receivers ($C_1, C_2 \ldots C_n$) and the coupling means between said receivers and the transmitters ($e_1, e_2 \ldots e_n$) comprising an apparatus (1) for electrically amplifying the signals, temporarily storing them and re-reading them at times ($t''_1, t''_2, \ldots t''_n$) so selected as to conform with the relationship $(Vt_1/V't''_1) = (Vt_2/V't''_2) = \ldots = \alpha$, V being the propagation velocity and $t_1, t_2 \ldots$ the travel time of the waves through the surveyed zone, V' being the propagation velocity and $t''_1, t''_2 \ldots$ the travel time of the waves through the sensitive element, whereby are identified the points P'' of the sensitive element which correspond to different concentrations of the energy of the waves transmitted through said elements, said points being located therein at distances from the transmitters ($e_1, e_2 \ldots e_n$) which are in the ratio of proportionality $\alpha$ with the distances to the receivers ($C_1, C_2 \ldots C_n$), from the corresponding diffracting and/or reflecting points of the surveyed zone.

Figure 2:
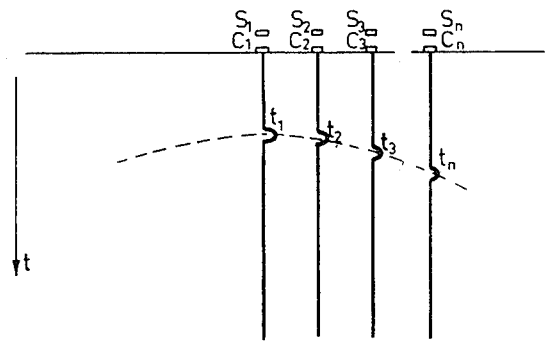
Figure 3:
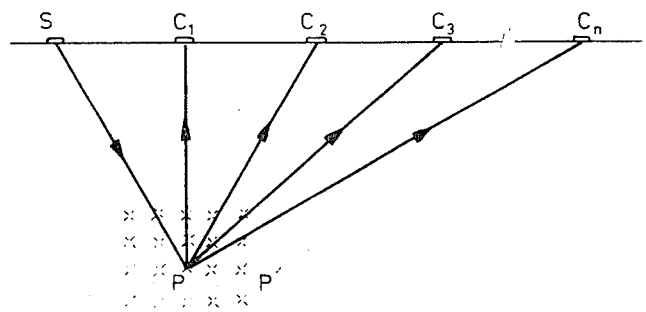
Figure 4:
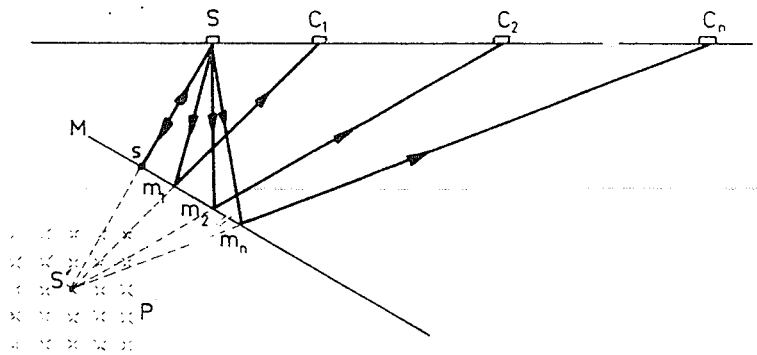
Figure 5:
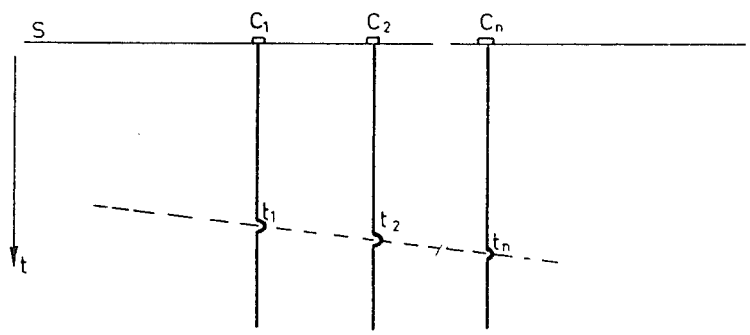
Figure 6:
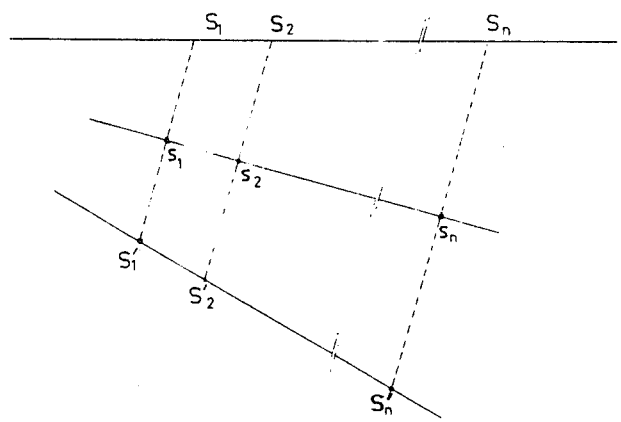
Figure 9:
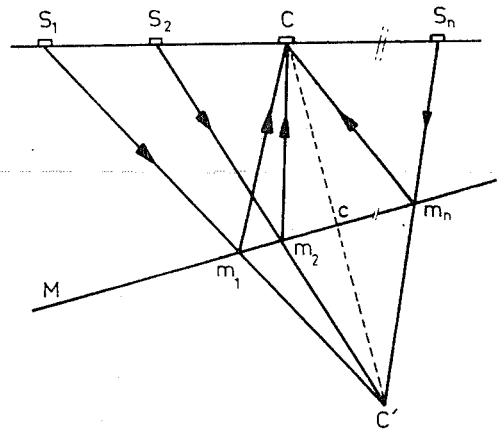
Figure 7:
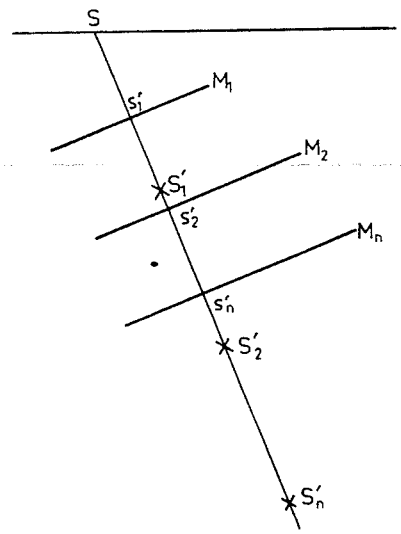
Figure 8:
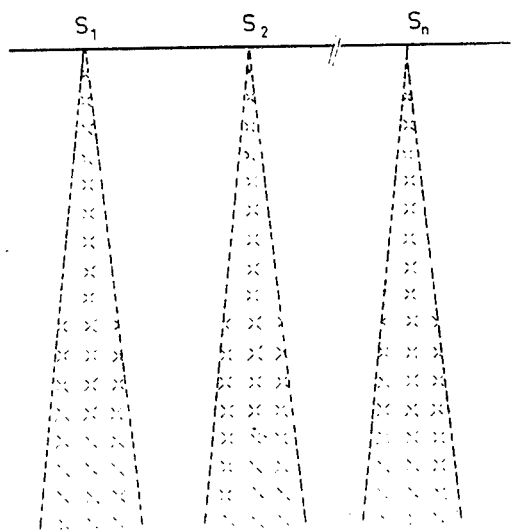
Figure 10:
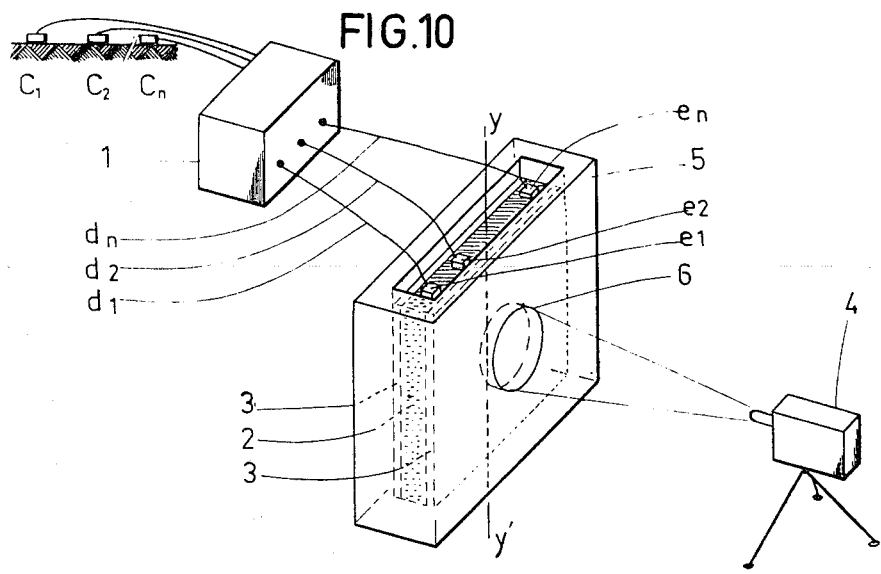
Figure 11:
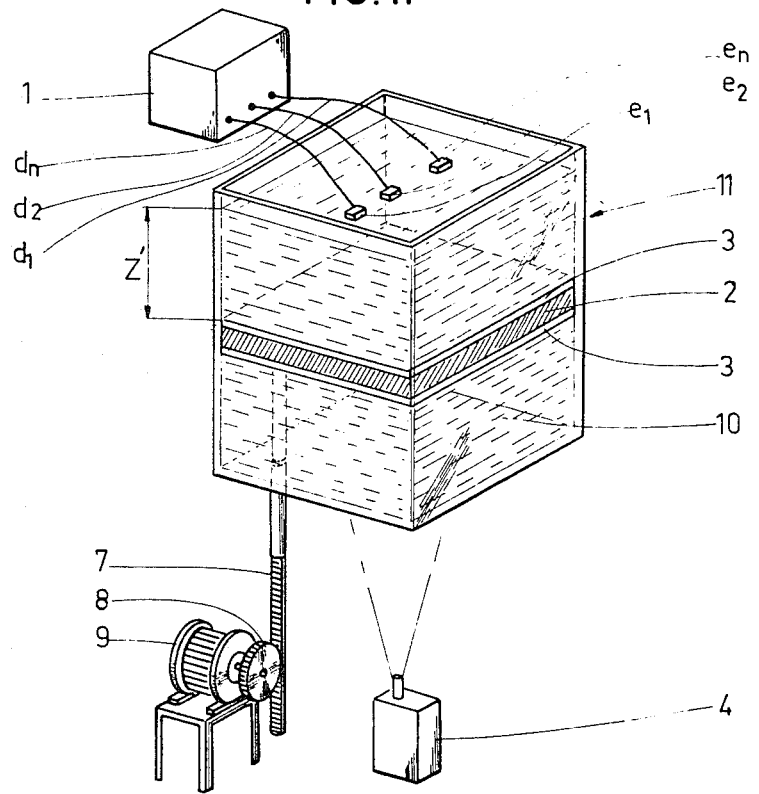

The method of composition of the recordings according to the invention and the device for practising such method are described more in detail with reference to the accompanying drawings which illustrate examples in the field of seismic prospecting and wherein :

FIG. 1 diagrammatically illustrates the use of the method of this invention for restoring a diffracting point when the transmission and reception points coincide, FIG. 2 shows a record of the diffracted waves according to FIG. 1, during time, FIG. 3 diagrammatically illustrates the use of the method for restoring a diffracting point in the case where reception points are different from transmission point, FIG. 4 diagrammatically illustrates the use of the method for restoring a point of a reflecting mirror having an inclination, FIG. 5 shows the record, during time, of the reflected waves according to FIG. 4, FIG. 6 illustrates the restoration of a reflecting mirror from the images of several transmission sources, FIG. 7 diagrammatically illustrates the application of the method for restoring a plurality of reflecting mirrors, FIG. 8 diagrammatically illustrates the application of the method to the restoration of a mirror whose inclination does not exceed 6°, FIG. 9 diagrammatically illustrates the application of the method of the invention to the restoration of a point of a reflecting mirror in the case the shots and the pick-ups have been distributed on the ground according to the so-called "transposed method", well known in the art, FIG. 10 shows a first embodiment, of the optical type, of the device according to the invention, FIG. 11 shows a second optical embodiment of the device of the invention, FIG. 12 shows a first embodiment, of the hydraulic type, of the device of the invention, FIG. 13 shows a second hydraulic embodiment of the device of the invention, FIG. 14 shows a variant of the embodiment of FIG. 13, and FIG. 15 shows a detail of the device of FIG. 14.

Referring now to FIG. 1, the waves transmission sources $S_1$, $S_2$, $S_3$ . . ., $S_n$, are placed in line, on the ground surface. Pick-ups $C_1$, $C_2$, $C_3$ . . . $C_n$ are placed respectively at the same points as the sources $S_1$, $S_2$, $S_3$ . . .$S_n$. A shot is fired successively at each of these transmission points, which transmits to the ground a relatively short pulse of a duration equal to or smaller than the travel time of waves between the diffracting points of the surveyed zone.

The waves received by the pick-ups $C_1$, $C_2$, $C_3$. . . , $C_n$, after diffractions thereof at a point P, are recorded in the form of pulses on the corresponding traces at times $t_1$, $t_2$, $t_3$ . . . $t_n$, corresponding respectively to the travel paths $S_1PC_1$, $S_2PC_2$, $S_3PC_3$, . . . $S_nPC_n$, as illustrated on FIG. 2.

In order to restore, from said recording, the actual location of point P, there is formed a network of points P', corresponding to the explored zone (FIG. 1) by arbitrarily selecting their co-ordinates in a vertical plane passing through the line formed by the transmission-reception device $S_1C_1$, $S_2C_2$, $S_3C_3$ . . . , $S_nC_n$. There are determined, for each point P' of this network, the distances $S_1P'C_1$, $S_2P'C_2$, $S_3P'C_3$. . ., $S_nP'C_n$.

The average propagation velocity Vm of the waves through the zone between points P' and the transmission-reception device being known, it can be deduced therefrom the propagation times $t'_1$, $t'_2$,. . . $t'_n$ corresponding respectively to the travel paths $S_1P'C_1$, $S_2P'C_2$, ...$S_nP'C_n$, by using the relationship $t'_1 = 2S_1P'/Vm$ with $2S_1P' = S_1P'C_1$ and $t'_n = 2S_nP'/Vm$ with $2 S_nP' = S_nP'C_n$.

From each recorded trace is taken a sample corresponding respectively, either to times $t'_1, t'_2, \ldots t'_n$ very precisely or to times $(t'_1 + \Delta t), \ldots, (t'_n + \Delta t)$ (the time interval $\Delta t$ corresponds, for example, to the pulse length). The so-selected portions of recording are then composed, i.e combined, for example by summation or correlation.

There can be summed up, for example, every millisecond, the different amplitudes of the samples $(t'_n + \Delta t)$ taken from the traces, the absolute value of each of these elementary sums being in turn summed up and the resulting value assigned to the corresponding point P' of the network.

The value assigned to point P' may alternatively be chosen equal to the sum of the products of the different amplitudes of the samples $(t_n + \Delta t)$ at identical times.

At each point P' of the restoration network will thus be assigned a value depending both of the amplitude of the pulses as recorded on the traces at the selected times and of the method of composition.

In the case it is desired to restore a single diffracting point P (FIG. 1), as long as no point P' of the network will coincide with point P, the value assigned to P' will be low, irrespective of the method of composition. On the contrary, the fact that a maximal value is obtained for a given point P', is an indication that said point P' coincides with the point P which is thus restored at its actual location in the ground. In the case of several diffracting points, there will be obtained on the network, after composition, a number of maximum values equal to the number of diffracting points.

When the utilized law of propagation velocity is accurate, the so-restored point P is located at its actual position in the ground, the method of the invention having thus realized an automatic migration. It is to be observed that the law of velocity may be determined according to well known methods.

The restoration network may be, for example, represented on photographic film or paper by expressing the different values assigned to the different points P' in the form of colour points of different intensities. In order to obtain continuous variations, there can be effected interpolations between adjacent points.

Any other type of representation showing the gradation between the different values of P' may also be used.

By this way there can be represented only those points to which are assigned values exceeding a given threshold, so as to eliminate all of those which do not correspond to diffracting points and the assigned values of which are lower. There is thus obtained a clear representation of a part of the sub-surface in a vertical plane.

This is a clear representation in view of the fact that each diffracting point is actually restored by a single point whereas, according to the conventional seismic prospecting methods the diffracting points will generate on the records hyperboles which can be troublesome for interpreting these records.

In the case of FIG. 1, the reception points were in coincidence with the transmission points. FIG. 3 illustrates the case a transmission source S is in line with a plurality of pick-ups $C_1$, $C_2$, $C_3$ . . . , $C_n$.

The same method as in the preceding case is used for the restoration of the diffracting points.

The travel time $t'_1$ corresponding for point P' to the travel path SP'C$_1$ will be:

$$t'_1 = (SP' + P'C_1/Vm)$$

Travel times $t'_2, \ldots t'_n$ will be determined in a similar way. Then, the record portions corresponding to the traces at the different times $t'_1, t'_2, \ldots t'_n$ will be combined to one another as before. When point P' of the network will coincide with the diffracting point P, the assigned value will be maximum as before, since to each travel time $t_n = (SP + PC_n/Vm)$ does correspond on each trace $n$ a maximum of amplitude.

It will be observed that, according to the conventional method, the number of recorded traces corresponds to the number of reception points. It is also possible, by use of the method of the invention, to obtain a final representation formed of traces similar to the traces obtained according to the conventional method, by successively determining the points of the network which are on the same vertical line.

Since, according to the method of the invention, the density of points P' of the network is selected at will, the traces of the final representation, formed by vertical alignments of these points, may have a preselected spacing which is not dependent on the spacing of the pick-ups on the ground.

For the restoration of the diffracting points, this network will be advantageously enlarged.

FIG. 4 diagrammatically illustrates the use of the method for restoring a reflecting mirror M. A transmission source S and pick-ups $C_1, C_2 \ldots, C_n$, are placed in line. The waves transmitted from S and which correspond to one pulse of a length equal to the distance between two successive mirrors to be restored, are reflected on mirror M at $m_1, m_2, \ldots m_n$, received at $C_1, C_2 \ldots C_n$ and recorded on the various traces at times $t_1, t_2 \ldots, t_n$ (FIG. 5). On this conventional record, the alignment of the waves at times $t_1, t_2 \ldots, t_n$ gives an image of mirror M but with a wrong inclination. Moreover points $m_1, m_2 \ldots, m_n$ are arbitrarily placed on the respective verticals passing through the reception points $C_1, C_2, \ldots C_n$, which is not correct.

It is then necessary to proceed to a "migration" operation so as to obtain the accurate inclination of the mirror $m$ and to restore points $m_1, m_2, \ldots m_n$ at their actual location.

According to the method of the invention there is not restored the points $m_1, m_2 \ldots m_n$ of mirror M, but the image's of the source S with respect to this mirror.

For this purpose, there is used, as heretofore, a restoration network. For each point P' thereof (FIG. 4) are calculated the travel distances $P'C_1, P'C_2, \ldots P'C_n$. Being known the law of average propagation velocity $V_m$ of the waves through said zone, the travel times are deduced therefrom:

$$t'_1 = (P'C_1/V_m) \ldots t'_n = (P'C_n/V_m)$$

As before, there is then selected for each point P', on each trace of the record as shown in FIG. 4, a sample corresponding respectively to times $t'_1, t'_2 \ldots, t'_n$ and these samples are composed for example by summation or correlation. The point P' to which is assigned the maximum value is the point which coincides with point S'.

It must be observed that, according to the method of the invention, the point S' is restored at its actual position, the present composition method providing automatically for the migration operation, irrespective of the location of the pick-ups $C_1, C_2 \ldots C_n$. Moreover the point S' is restored by means of n different travel paths corresponding to the n pick-ups, which constitutes a "multiple coverage" operation.

As already mentioned, the restored point S' is the image point of the source S with respect to mirror M. The corresponding point s of the mirror is easily restored by using the relationship $Ss = SS'/2$ and carrying this length on the straight line SS', which results in a similarity with a ratio of 1/2.

By repeating the operation with several transmission sources $S_1, S_2 \ldots S_n$, (FIG. 6) there are restored, by the method of the invention, the image points of said sources $S'_1, S'_2 \ldots S'_n$ and, by application of a similarity ratio of 1/2, points $s_1, s_2, \ldots s_n$ of mirror M are deduced therefrom. The alignment of these points $s_1, s_2 \ldots s_n$ constitute the representation of mirror M at its actual position with its accurate inclination.

In the case of several mirrors $M_1, M_2, \ldots M_n$ (FIG. 7) there is obtained, according to the method of the invention, a number of images $S'_1, S'_2 \ldots S'_n$ of the source S equal to the number of mirrors and, by application of a similarity ratio of 1/2, the points $s'_1, s'_2 \ldots s'_n$ of the different mirrors are deduced therefrom.

It is noticeable that, according to this method, the values assigned to points P' of the network which are not in coincidence with the image of the source or the diffracting point to be restored are not zero, due to the noise level and the principle of the method. But it is possible to estimate a noise threshold so as to represent only the image points, the value assigned to a point P' which coincides with an image point being considerably higher than the other values.

FIG. 8 illustrates the use of the method of the invention for restoring a mirror whose inclination, with respect to the horizontal line, does not exceed 6°, which is a frequent case in seismic prospecting. In such a case, there is chosen a network of points P' located inside a cone with its vertex at transmission point $S_1$ and a vertex angle of 12° (6° on both sides of the vertical). The same operation is repeated from transmission points $S_2, \ldots S_n$. There are thus restored the images points of sources $S_1, S_2, \ldots S_n$, with respect to mirrors having an inclination not in excess of 6°. By this way mirrors of a greater inclination, the image of which is not desired, are eliminated. This results in direct selection of the mirrors according to their inclination.

When it is desired to restore from a recording both the diffracting points and the reflecting mirrors of the surveyed zone, the selected network of points P' must be of a sufficient extent. A portion of this network is defined by an angle having its apex at the transmission source and corresponding to twice the angle of inclination of the mirrors to be restored. To the points P' inside said angle is applied the restoration method of the image points with respect to reflecting mirrors, as above-described with reference to FIG. 4, and the points of the mirrors are deduced therefrom.

To the points P' of the network external to said angle is applied the restoration method for diffracting points as already described with reference to FIG. 1.

In this manner there are neglected a few informations relating to the diffracting points and corresponding to the portion of the network inside said angle. However, since a diffraction hyperbole generally extends over a great number of traces, it is still possible to obtain a satisfactory restoration of these diffracting points.

There can also be used, for the restoration of diffracting points or reflecting mirrors, the so-called transposed method, i.e a method for restoring the image of the pick-ups with respect to the mirror, since, for each of the travel paths $S_1 m_1 C, \ldots S_n m_n C$, it can be reasoned, according to the principle of the reversibility of the waves path, as if the transmission point were at C and the different pick-ups at $S_1, S_2 \ldots, S_n$.

Thus, according to FIG. 9, several transmission sources $S_1, S_2, \ldots S_n$, are laid in line with pick-up C and transmit identical waves. By application of the method for restoring reflecting points, as above-described, using a network, there is restored the image C' of the receiving point C and, by applying a similarity ratio of 1/2, the corresponding reflecting point C of mirror M. In this case, the shots at the transmission points are fired sequentially so as to obtain several records, corresponding to different travel paths of the waves, for the same receiving point and make a composition of these records.

It is also possible to combine the normal method with the transposed method.

The preceding examples are particularly applicable to seismic prospecting in the case the transmitters and the receivers are placed in line. It is of course, possible to place the transmission and the reception points along two different directions on the ground.

In these cases the points of the restoration network will no longer be in the same vertical plane but will form a volume.

The preceding examples have been described with reference to seismic prospecting. It is however obvious that the described method for combining records may be applied as well to records of acoustic, ultrasonic or radio-waves without departing from the scope of the invention.

As said before, the restoration network may be represented on photographic paper or film by colour points whose intensities depend on the values assigned to the different points P' of the network.

This can be achieved for example by representing a portion of the surveyed zone comprising the restoration network, in a vertical plane or as a volume, by means of a model.

Such a model can be, for example, an optical model, wherein the portion of the surveyed zone will be represented by a material optically sensitive to signals derived from received waves.

In this case, the values assigned to the different points P' will be represented by different colours at points P'' of the model.

The model may also be of the hydraulic type. In this case, the values assigned to points P' are represented by different vertical amplitudes taken by the different points of the surface of the liquid and induced by signals derived from the received waves.

The light points of higher intensity and of a certain colour in the first case, or the points of higher amplitude in the second case, represent, with the reduction factor of the model, the diffracting points and/or the images of the transmission or reception points with respect to a reflecting plane, at their actual position in the surveyed zone.

In these different cases, pictures of the model can be taken by photographic means.

Embodiments of the device and their practice are described by referring as example to their use in seismic prospecting.

However other types of use can also be contemplated, such as uses in biology or medicine for surveying the inside of the body.

In the optical model shown in FIG. 10, there is used a material whose optical properties change as a function of the acoustic energy received thereby. Known substances of this type are the so-called liquid crystals. Some of these substances are changing in colour in accordance with the intensity of the received waves.

When it is desired to represent a vertical portion of the sub-surface in a plane passing through the line of the receivers (e.g. $C_1, C_2, \ldots C_n$ of FIG. 1). a thin slice of said substance will be placed between two transparent thin plates either of glass or of plastic material.

The device comprises an element 1 for the electric amplification, the temporary storage of the signals issued from pickups $C_1, C_2 \ldots, C_n$, and the re-reading, in a suitable form, of said signals.

A thin slice 2 of liquid crystals forming the sensitive element is contained between two plates 3 of glass or transparent plastic material. Ultra sonic waves transmitters $e_1, e_2 \ldots e_n$, consisting for example of piezo electric pellets are placed along one edge of element 2 and receive from element 1, through electric circuits $d_1, d_2 \ldots d_n$, the signals issuing from pick-ups $C_1, C_2 \ldots C_n$.

A camera or motion camera 4 records the optical appearance of element 2 observed directly or by reflection.

The upper end of element 2, where are placed the transmitters $e_1, e_2 \ldots e_n$, represents that part of the ground surface which corresponds to the selected vertical section of the subsurface and axis $yy'$ of element 2, perpendicular to the line of $e_1, e_2 \ldots e_n$, represents the vertical axis of the sub-surface section.

Acoustic waves are transmitted to element 2, in a suitable manner, from transmitters $e_1, e_2 \ldots e_n$, fed with the signals issued from element 1 and will be combined within the liquid crystal layer 2. Energy concentrations are produced at the points of the model where the waves arrive in phase and these points correspond, according to the above-described method, either to images of emission points or to diffracting points or, when practising the so-called transposed method, to images of pick-ups. At the locations of energy concentrations in layer 2 (FIG. 10) a colour change occurs.

By way of example an energy of from $10^{-6}$ to $10^{-8}$ W.sec.cm$^{-2}$ results in a change by 1,000 A of the light wave length reflected from the model. This change is easy to detect and to record, for example on a photographic film.

In order to obtain from the model an accurate representation of the surveyed medium it is necessary that the distances in said surveyed medium and the model be all proportional.

For example in the case of FIG. 3, which shows a diffracting point P and pick-ups $C_1, C_2 \ldots C_n$ distributed on the ground the restoration model must comprise transmitters $e_1, e_2 \ldots e_n$ which generate a concentration of ultra-sonic energy at a point P'' of the model, so that
:

$$(C_1C_2/e_1e_2) = \ldots = (C_1C_n/e_1e_n) = \alpha, \text{ and} \quad (1)$$

$$(C_1P/e_1P'') = (C_2P/e_2P'') = \ldots = (C_nP/e_nP'') = \alpha \quad (2)$$

$\alpha$ being the similarity ratio or coefficient of proportionality. $t_1, t_2 \ldots t_n$ being the actual propagation times in the subsurface from the diffracting point P to the pick-ups $C_1, C_2 \ldots C_n$, and $t''_1, t''_2 \ldots t''_n$ being the corresponding propagation time in the model, the above mentioned similarity condition results in the following relationship:

$$(V\, t_1/V' t''_1) = (V\, t_2/V' t''_2) = \ldots = (V\, t_n/V' t''_n) = \alpha \quad (3)$$

In this relation V is the average propagation velocity of the waves through the surveyed medium and V' the average propagation velocity of the ultra-sonic waves through the entire model. It will be convenient to give to the model a thickness substantially smaller than the wave length of the ultra-sonic waves. When, for example, the length of the ultra-sonic waves transmitted from transmitters $e_1, e_2 \ldots e_n$ is about from 1 to 2 cm, a total thickness of the model of 2 to 4 mm will be convenient.

In this case, the propagation velocity V' of the ultra-sonic waves through the model is dependent, as known, on the respective specific gravities and thicknesses of elements 2 and 3 of FIG. 10, as well as on specific propagation velocities through said elements, taken separately.

Let us consider the example wherein:
V = 3,000 m/s
V' = 2,300 m/s
$\alpha$ = 5,000

In order to have the preceding relationship verified, the respective propagation times through the surveyed medium and through the model must be in the ratio:

$$t/t'' = (V'/V)\, \alpha \approx 3,825$$

$t$ being the propagation time through the surveyed medium and $t''$ the propagation time through the model.

The time scale at the moment of the restoration in the model will thus be contracted by a factor of 3,825 with respect to the time scale at the moment of the recording.

This contraction will be carried out in element 1 of FIG. 10 which stores in a memory the signals issued from pick-ups $C_1, C_2 \ldots, C_n$ and return them, by means of circuits $d_1, d_2, \ldots d_n$, after the desired contraction, through rapid analogical outlets.

This is made possible by using, for example, magnetic memories on discs with 15 bits. As a matter of fact it is usual to make a digital recording, on the field, of a signal sample taken each 2 milliseconds. When the signals are transferred on magnetic discs, they can be re-read at a speed of 2 $\mu$s for 60 bits, corrsponding to four samples.

The ratio between the recording time and the reading time is therefore 4,000.

It is moreover preferred that element 1 supplies signals to transmitters $e_1, e_2 \ldots e_n$ in such a way that the first signals transmitted through the model be the latest signals recorded by the pick-ups $C_1, C_2 \ldots C_n$.

By this way the points of the model where are produced high energy concentrations, change their colour in accordance with the intensity of said concentration, thus resulting in a materialization of the diffracting points such as P (FIG. 3) or of the images of the transmission point such as S' (FIG. 4). When the model is enlightened with white light through a suitable filter, there can be seen points catching alight when reached by ultra-sonic waves producing an energy accumulation. By means of apparatus 4 (FIG. 10) the optical state of the model may be photographed on a colour film.

In this optical device all the image points and all the diffracting points relative to the same transmission point will become coloured (or will change their colour).

If the diffracting point P is, for example, located at 1,000 m from the ground surface, the similarity ratio being 5,000, the corresponding point P'' of the model will be at 20 cm from the upper edge of the model, where are placed the transmitters $e_1, e_2 \ldots e_n$.

In this case point P'' will become coloured after a time interval $\Delta t$ from the beginning of the transmission of the waves in the model by the transmitter placed on the vertical line passing at P'', which is:

$$\Delta t = (20 \cdot 10^{-2}/2,300) = 87 \cdot 10^{-6} \text{ s}$$

the propagation velocity V' of the waves through the model being 2,300 m/s.

The change of the optical properties of element 2 formed of liquid crystals being produced by the heating generated by the ultra-sonic waves, the model must accordingly be kept at a very constant temperature for example by use of a thermoregulation jacket 5 (FIG. 10) so that the colour variations from one point to another be only the result of different amplitudes of the ultra-sonic waves.

The camera 4 may be placed outside from said jacket and the photos taken through a transparent side-light 6 (FIG. 10).

It has been assumed, up to now, that the propagation velocity V' of the ultra-sonic waves inside the model was constant. Accordingly the model would give a true representation only of the surveyed zones for which can be defined a substantially stable average velocity for all the points.

However in order to obtain a more accurate representation, in the case where the propagation velocity varies with the depth in a given zone, for example in the sub-surface in the case of seismic prospecting, a model can be realized wherein the propagation velocity of the waves varies according to the same law. As a matter of fact, as said before, the velocity V' in the model is dependent on the relative thicknesses of elements 2 and 3 (FIG. 10). By varying conveniently the thicknesses, there can be obtained different propagation velocities in certain zones of the model. It is possible, for example, by varying linearly the thickness of elements 3 to obtain a linear variation of V' as a function of the distance between the transmitters $e_1 \ldots e_n$.

At each transmission point at the ground surface will correspond, in element 2 of the model, a number of light points equal to the number of diffracting points and reflecting layers reached by the acoustic waves which, after diffraction or reflection on these diffracting points or reflecting layers, have been recorded by the pick-ups.

After photographic recording, when no more signals reach transmitters $e_1, e_2 \ldots e_n$, the entire model, due to the effect of the thermoregulating jacket, recovers a uniform colour and transmitters $e_1, e_2 \ldots e_n$ may be supplied with signals corresponding to another transmission point.

According to the invention, there can also be used a restoration model of a different conception, as illustrated in FIG. 11.

Similarly to the model shown in FIG. 10, this model comprises a sensitive element 2 formed of a layer of liquid crystals between two transparent elements 3 in a horizontal position and representative of a horizontal section of the surveyed subsurface zone.

The ultra-sonic waves transmitters $e_1, e_2 \ldots, e_n$, are for example placed in line. To the sensitive assembly formed of elements 2 and 3, are associated mechanical means, for example gear elements 7 and 8 actuated by a motor 9, providing for the displacement of the sensitive element by a translation along a direction perpendicular to that of the line of the transmitters $e_1, e_2 \ldots, e_n$. The elements 2 and 3 are submerged into a liquid 10 which may be water, the whole being contained in a vessel 11. The transmitters $e_1, e_2 \ldots e_n$, are for example placed at the open surface of a liquid 10 or at the vicinity thereof. It is thus possible, by placing the assembly of elements 2 and 3, by means of mechanical elements 7 and 8, at the selected depth $Z'$ to make a detail survey of the image of a sub-surface section at a depth $\alpha Z'$, precisely determined by taking into account the similarity ratio $\alpha$, without having the informations corresponding to the surveyed zone disturbed by other informations corresponding to layers at other depths.

Up to now there has been described a device wherein the transmitters $e_1, e_2 \ldots e_n$ were placed in line, similarly as the pick-ups $C_1, C_2 \ldots C_n$ at the ground surface. However it is obvious that, if pick-ups $C_1, C_2, \ldots C_n$ are distributed in a two-dimensional zone, i.e on a surface, the distribution of the transmitters of the model will thus be arranged similarly. The restoration will then be effected in a three-dimensional space. The sensitive element 2 of FIG. 11 then no longer consists of a thin layer of liquid crystals but of a volume thereof.

On the contrary, the device of FIG. 11 where the element 2 represents a horizontal slice of the sub-surface, will be associated with pick-ups distributed in a two-dimensional zone on the ground surface. In this case the element 2 keeps the same geometry (rectangular or square). It suffices that this element be large enough in a horizontal direction as to form the different images corresponding to different sub-surfaces sections and be not located at the vertical of the transmission point.

In the preceding examples, there has been chosen an element 2 formed of liquid crystals but it is obvious that there can be used as well any other substance whose optical properties are changed under the influence of ultra-sonic waves.

According to another embodiment of the device of the invention, there can be used a hydraulic model such as shown in FIG. 12 instead of an optical model.

This hydraulic model comprises a container 13 filled with a liquid 14 forming the sensitive element and which can be water. Ultra-sonic waves transmitters $e_1, e_2 \ldots e_n$ are actuated, as precedingly, by the signals issued from the pick-ups $C_1, C_2, \ldots C_n$ (FIG. 3) and conveyed through element 1. These transmitters are arranged, for example in line, on the upper face of a support-plate 12, horizontally placed in the container 11 and which, through a lifting mechanical system (7, 8, 9) may be brought nearer or farther from the open surface of the liquid 14.

The ultra-sonic waves, transmitted towards the surface by the transmitters $e_1, e_2 \ldots e_n$, combine to one another and generate, at the liquid surface, small waves the greater of which correspond to a greater concentration of energy at their location. In view of the selected scale, it is thus possible, by moving plate 12 more or less away from the liquid surface, to reproduce thereon the acoustic image of a corresponding slice of the sub-surface located at a determined depth.

The liquid surface may be photographed by reflection by directing on said surface, with a given incidence angle, a light beam 15. The latter is reflected on the surface of liquid 14 and, by means of an optical system formed of a mirror 16 and a lens 17, the image of the surface is formed in a plane 18.

According to another embodiment, illustrated in FIG. 13, there can also be used a slightly different hydraulic model so as to reproduce the image of a whole vertical section of the sub-surface when using a transmission and a reception device in line.

This model comprises a tank 13 containing a liquid 14 which may be water. The ultra-sonic waves are transmitted through transmitters $e_1, e_2, \ldots e_n$, placed in the vicinity of the open surface of the liquid, for example in line, along a direction parallel to said surface.

It is thus formed, at the surface of the liquid, small waves the combination of which gives a horizontal image of a vertical section of the sub-surface. To an image point or to a diffracting point will correspond a point of great amplitude of a small wave.

According to another embodiment of the model, illustrated in FIG. 14, ultra-sonic waves can be also transmitted from elements $f_1, f_2, \ldots f_n$, perpendicular to the surface of the liquid and immersed therein with an amplitude corresponding to that of the transmitted signals. These elements may consist of small sticks $f_1, f_2, \ldots f_n$, each coupled with the vibrating membrane of a loudspeaker 19 (FIG. 15). Each of said loudspeakers corresponds to a receiver $C_1, C_2 \ldots C_n$ and is actuated by an amplifier 20 receiving the signals issued from an element such as element 1 of FIG. 10. The small sticks $f_1 \ldots f_n$ thus vibrate in a vertical direction and wave the surface of the liquid in accordance with the signals issued from the amplifying elements 20.

It must be noted that, in the case of hydraulic devices (FIGS. 12 and 13), the models will give an accurate image of the sub-surface only if the distances between the small waves are greater than 0.1 mm. This must be taken into account when selecting the scale of the model and it is easy to achieve in the case of models of seismic prospecting by reflection.

In the preceding examples, it has been assumed that pick-ups $C_1, C_2 \ldots C_n$ were arranged in a common plane at the ground surface. Accordingly the transmitters of the model could also be placed in a common plane. When such an arrangement is impossible there can be realized a device for varying the location of the transmitters $e_1, e_2 \ldots e_n$ of the model, in accordance with the position of the pick-ups at the ground surrace, taking into account the similarity ratio $\alpha$. There can also be introduced, in the electric circuits of the device 1, retarding elements to compensate for the differences in the propagation time resulting from the difference in the location of the pick-ups.

It will be understood that while there have been given herein certain specific examples of the practice of this invention, it is not intended thereby to have this invention limited to or circumscribed by the specific details of materials, proportions or conditions herein specified, in view of the fact that the invention may be modified according to individual preference or conditions without necessarily departing from the spirit of this disclosure and the scope of the appended claims.

We claim:

1. A method for composing recordings of signals corresponding to waves emitted in a surveyed zone of a medium from at least one transmission point and received at a plurality of reception points during time, the waves being diffracted in said zone and/or reflected by at least one reflecting mirror of the zone, so as to visually locate at their actual location in space, wave diffracting points and the image of the transmission point with respect to the reflecting mirror in a physical model representative of the surveyed zone, the waves being recorded as signals on separate traces each corresponding to the waves received at each reception point and transmitted from the transmission point, comprising the steps of selecting from each recorded signals a sample corresponding to the travel time of the waves over the distance from the transmission point to each reception point through different points P′ selected in the zone, applying the samples to the model, and composing with one another in the model the samples of recorded signals corresponding to each point P′ wherein each point P′ has a value representative of the result of said composition, the diffracting points and the image of the transmission point being positioned at locations of the points P′ whose values are the highest.

2. A method for composing recordings according to claim 1, wherein the duration of the transmitted waves is no greater than the travel time of waves between one of two reflecting points and two diffracting points, the location of which is desired.

3. A method for composing recordings according to claim 1, wherein the actual position of the reflecting point of the mirror with respect to the corresponding image point of the transmission point is determined as the middle of a segment of a straight line joining the transmission point and the image point thereof.

4. A method for composing recordings according to claim 1, wherein the image of the transmission point with respect to the mirror of which inclination angle with respect to a horizontal line is at most n degrees, is determined by combining samples of the recorded signals corresponding to the travel time of waves over the distance from the transmission point to the reception points through points P′ located inside a cone of vertical axis having its vertex at the transmission point and a vertex angle of 2 n degrees.

5. A method for composing recordings to claim 4, wherein the image of the transmission point and the diffracting points are respectively determined by composing samples of the recorded signals corresponding respectively to points P′ selected inside and outside the cone.

6. A method for composing recordings according to claim 1, wherein the duration of the sample selected from each recorded signal is substantially equal to that of the transmitted wave duration.

7. A method for composing recordings of signals, corresponding to identical waves emitted in a surveyed zone of a medium from successive transmission points and received at least at one reception point during time, the waves being diffracted in said zone and/or reflected by at least one reflecting mirror of the zone, so as to visually locate at their actual location in space, wave diffracting points and image of the reception point with respect to the reflecting mirror in a physical model representative of the surveyed zone, the waves being recorded as signals on separate traces each corresponding respectively to the waves received at the reception point and transmitted from the successive transmission points, comprising the steps of selecting from each recorded signals a sample corresponding to the travel time of the waves over the distance from each successive transmission point to the reception point through different points P′ selected in the zone, applying the samples to the model, and composing with one another in the model the samples of the recorded signals corresponding to each point P′ wherein each point P′ has a value representative of the result of said composition, the diffracting points and the image of the reception point being positioned at locations of the points P′ whose values are the highest.

8. A method for composing recordings according to claim 7, wherein the actual position of the reflecting point of the mirror with respect to the corresponding image point of the reception point is determined as the middle of a segment of a straight line joining the reception point and the image point thereof.

9. A method for composing recordings according to claim 7, wherein the images of the reception point with respect to the mirror of which inclination angle with respect to a horizontal line is at most n degrees, is determined by combining samples of the recorded signals corresponding to the travel time of waves over the distance from the transmission points to the reception point through points P′ located inside a cone of vertical axis having its vertex at the reception point and a vertex angle of 2 n degrees.

10. A method for composing recordings according to claim 9, wherein the image of the reception point and the diffracting points are respectively determined by composing samples of the recorded signals corresponding respectively to points P′ selected inside and outside the cone.

11. A method for composing recording according to claim 7, wherein the duration of the sample selected from each recorded signals is substantially equal to that of the transmitted wave duration.

12. A method for composing recordings according to claim 7, wherein the duration of transmitted waves is no greater than the travel time of waves between one of two reflecting points and two diffracting points, the location of which is desired.

13. A method for composing recording of signals corresponding to identical waves emitted in a surveyed zone of a medium from a plurality of successive transmission points and received at a plurality of reception points during time, the waves being diffracted in said zone and reflected by at least one reflecting mirror of the zone, so as to visually locate at their actual location in space, wave diffracting points and images of transmission points and reception points with respect to the reflecting mirror in a physical model representative of the surveyed zone, the waves being recorded as signals on separate traces each corresponding respectively to waves received at each reception point and transmitted from each successive transmission point, comprising the steps of selecting from the recorded signals samples corresponding respectively to the travel time of the waves over the distance from the successive transmission points to the reception points through different points P' selected in the zone, applying the samples to the model, and composing with one another in the model samples of the recorded signals corresponding to waves received successively at each reception point and emitted from the successive transmission points with the samples corresponding to each point P' as well as composing with one another in the model samples of the recorded signals corresponding to waves received at the reception points and emitted from each of the successive transmission points with the samples corresponding to each point P' wherein each point P' has values representative of the results of said compositions, said diffracting points, the images of the reception points and the images of the transmission points at locations of the points P' whose values are the highest.

14. A device for composing recordings of signals corresponding to waves emitted in a surveyed zone of a medium and received at a plurality of reception points during time, said waves being diffracted in the zone and/or reflected by at least one reflecting mirror of the zone, so as to locate at their actual location in space wave diffracting points and the image point of at least a transmission point or at least a reception point with respect to the reflecting mirror, and to provide a visual representation of said wave diffracting points and of said image point of the surveyed zone, consisting in a model comprising an element sensitive to ultra-sonic waves, the element being associated with n transmitters of ultrasonic waves which are connected through coupling means to corresponding $n$ receivers of the waves which have been transmitted through the surveyed zone and diffracted and reflected from the zone, the sensitive element having its dimensions deducible from the dimensions of the surveyed area by a proportionality factor $\alpha$, the spacing between the transmitters being respectively deducible, by the same proportionality factor $\alpha$ from the corresponding spacings between the receivers, and the coupling means between the receivers and the transmitters comprising an apparatus for the electric amplification of the received wave signals and for temporarily storing and re-reading the signals during times $(t''_1, t''_2 \ldots t''_n)$ so selected as to conform with the relationship:

$$(V\ t_1/V't''_1) = (V\ t_2/V't''_2) = \ldots = \alpha,$$

V being the propagation velocity and $t_1, t_2 \ldots$ the propagation times of the waves through the surveyed zone, V' being the propagation velocity and $t''_1, t''_2 \ldots$ the propagation times of the waves through the sensitive element, so as to make apparent the points P'' of the sensitive element which correspond to different energy concentrations of the waves transmitted through said element and which are located therein at respective distances from transmitters, in the proportionality factor $\alpha$ with the distances from the receivers of the corresponding diffracting and reflecting points of the surveyed zone.

15. A device according to claim 14, further comprising means associated with the model for recording the condition of the sensitive element.

16. A device according to claim 14, wherein the sensitive element consists of a thin layer of liquid crystals undergoing light changes by the effect of ultra-sonic waves.

17. A device according to claim 14, wherein the sensitive element is contained between two plates of transparent material to form an assembly.

18. A device according to claim 17, wherein the assembly formed by the sensitive element and the plates of transparent material is arranged within a thermal jacket.

19. A device according to claim 18, wherein the assembly formed of the sensitive element and the plates of transparent material is arranged in a tank containing a liquid, the transmitters being in contact with the surface of said liquid, and means associated with the assembly for positioning the assembly along a vertical direction of the tank.

20. A device according to claim 14, wherein the sensitive element consists of a volume of liquid contained in a tank and whose surface undergoes changes by the effect of ultra-sonic waves.

21. A device according to claim 20, wherein the transmitters are placed on the upper face of a substantially horizontal plate, and means associated with the plate for positioning the plate along a vertical direction of the tank.

22. A device according to claim 21, wherein the transmitters are placed on a wall of the tank.

23. A device according to claim 21, wherein the plate is positioned at a depth in the tank which is deducible from the depth of the selected slice of the surveyed zone by the proportionality factor $\alpha$.

24. A device according to claim 14, wherein the sensitive element has a thickness smaller than the wave length of the transmitted ultra-sonic waves.

* * * * *